United States Patent [19]

Shary et al.

[11] Patent Number: 5,049,172
[45] Date of Patent: Sep. 17, 1991

[54] BLOW OUT RESISTANT FILTER

[75] Inventors: Stephen P. Shary, Meggett; Lloyd D. Waitschies, Charleston, both of S.C.

[73] Assignee: Life Cycle Engineering, Inc., Charleston, S.C.

[21] Appl. No.: 559,217

[22] Filed: Jul. 23, 1990

[51] Int. Cl.$^5$ .............................................. B01D 46/00
[52] U.S. Cl. ........................................ 55/495; 55/497; 55/531
[58] Field of Search .......... 55/495, 497, 521, DIG. 31

[56] References Cited

U.S. PATENT DOCUMENTS

| | | | |
|---|---|---|---|
| 3,620,375 | 11/1971 | Atkins | 55/497 X |
| 3,925,043 | 12/1975 | Matrone | 55/497 X |
| 4,177,050 | 12/1979 | Culbert et al. | 55/DIG. 31 |
| 4,610,705 | 9/1986 | Sarnosky et al. | 55/DIG. 31 |
| 4,732,675 | 3/1988 | Badolato et al. | 55/DIG. 31 |

Primary Examiner—Charles Hart
Attorney, Agent, or Firm—B. Craig Killough

[57] ABSTRACT

A filter for filtering gases, such as air, using a backing material on the downstream side of a filter media to prevent the filter media from blowing out, or separating from a frame. The backing material is congruent in shape with the filter media, so that if the filter media is pleated, the backing material is pleated in a like shape. The backing material may extend to an upstream side of said filter media so as to further aid in blow out resistance.

2 Claims, 3 Drawing Sheets

BLOW OUT RESISTANT FILTER

BACKGROUND AND SUMMARY OF THE INVENTION

The present invention relates to filters generally, and is more specifically directed to a filter which is particularly suited for use in air handling systems which handle large volumes of air, wherein long service live and "blow out resistance" is necessary.

Filters and filter media are used in many applications for filtering gases and liquids. The use of filters, for filtering gases, particularly air in air handling systems, is well known. Such filters as are commonly used in air handling systems are characterized by a frame, in which a filter media is present within the perimeter of the frame. A rigid backing maybe placed within the frame downstream of the filter media to aid in retaining the filter media within the frame, while allowing air to pass through the filter.

In certain applications, such as air handling systems where high volumes of air are circulated through the system, "blow out" is encountered. "Blow out" may be defined as separation of the filter media from the frame, typically at the point of bonding of the media to the frame. Pressure on the media which exceeds the strength of the bonding means will result in such blow out.

Such blow outs may have seriously adverse consequences. Blow outs allow carbon, dust, or other material previously trapped to enter into the system, where it may cause damage to the mechanism which the filter protects. The filter media itself, as it is separated from the frame, will also enter the system, causing damage to the system, or resulting in harmful localized atmospheric conditions, especially in a closed recirculating system. Blow outs may go undetected for some period of time, and filters may be located in areas which make frequent servicing difficult.

In high volume applications, the filter media maybe pleated. This pleating increases the effective filter surface area. Frequently, before blow out, these pleats will collapse, increasing the differential pressure across the filter. Points of high pressure on the upstream side which result from the collapsing pleats increase the likelihood of filter blow out.

The present invention uses a frame and filter media. The present invention prevents blow outs by using a rigid, porous backing which is congruent with the shape of the filter media so as to contact the media at all points and provide support to prevent blow out. The backing may further encapsulate one or more edges of the filter media on the upstream side to aid in shape retention of the media, and further aid in holding the media in place to deter media blow out.

DETAILED DESCRIPTION OF THE PREFERRED EMBODIMENT

Figure 1:
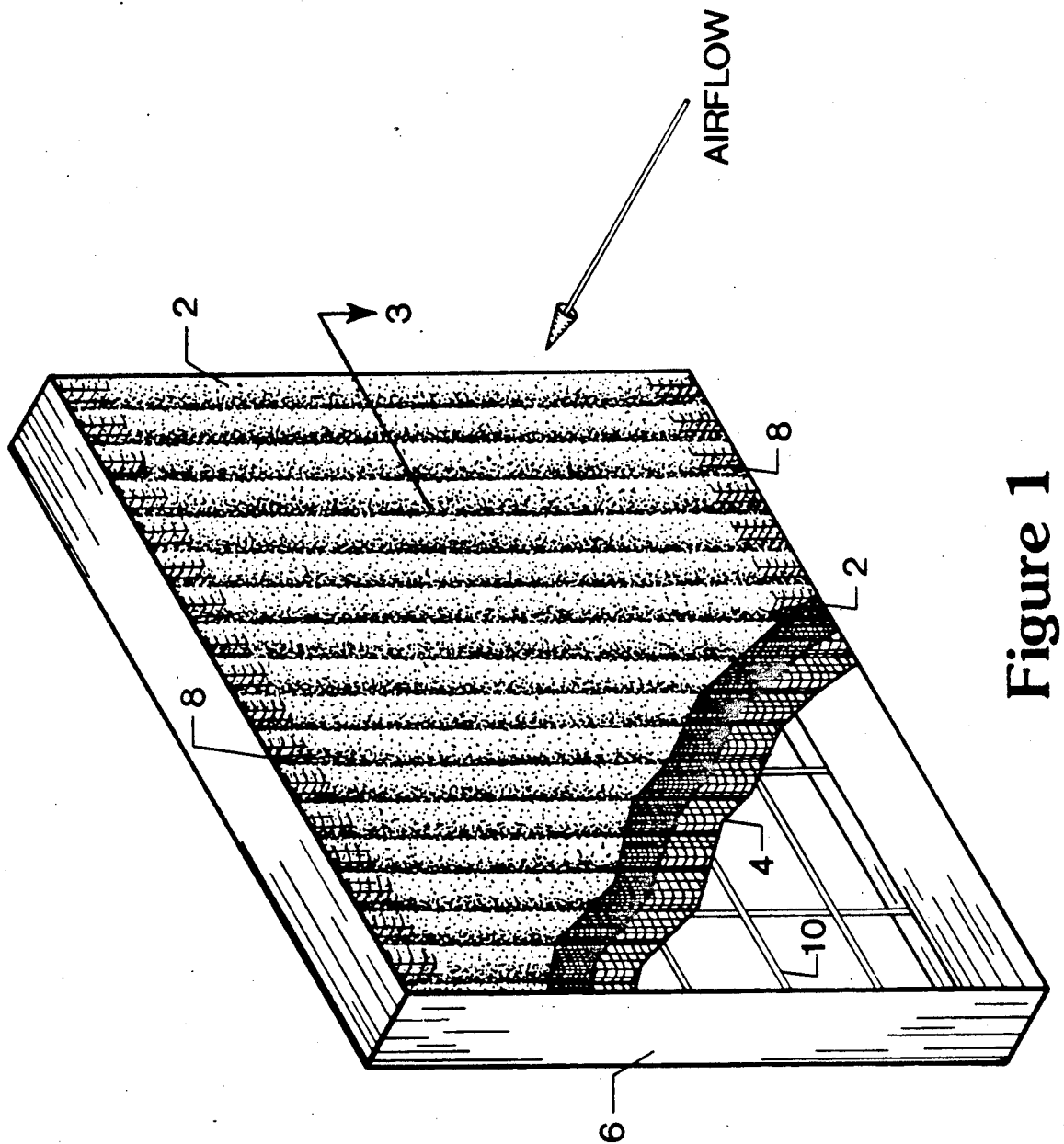
FIG. 1 is a perspective view of the filter with a portion of the filter media sectioned.

As shown in FIG. 1, the filter has a filter media 2 and a backing material 4, contained within a frame 6. This frame 6 will typically be rectangular or square in shape as shown, but could be any desired shape. In most cases, the filter will be contained within a frame which is part of the filter, but such frame may not be necessary, depending on the application.

The filter media 2 may be any commonly known and used filter media. By way of example, a typical filter media may be fiberglass filter media such as that known and specified as Manville Fiberglass Filtration Media AFS. In the preferred embodiment, the filter media will be pleated so as to increase the effective surface area of the filter. The filter media may be flat, or shaped otherwise as needed.

Figure 3:
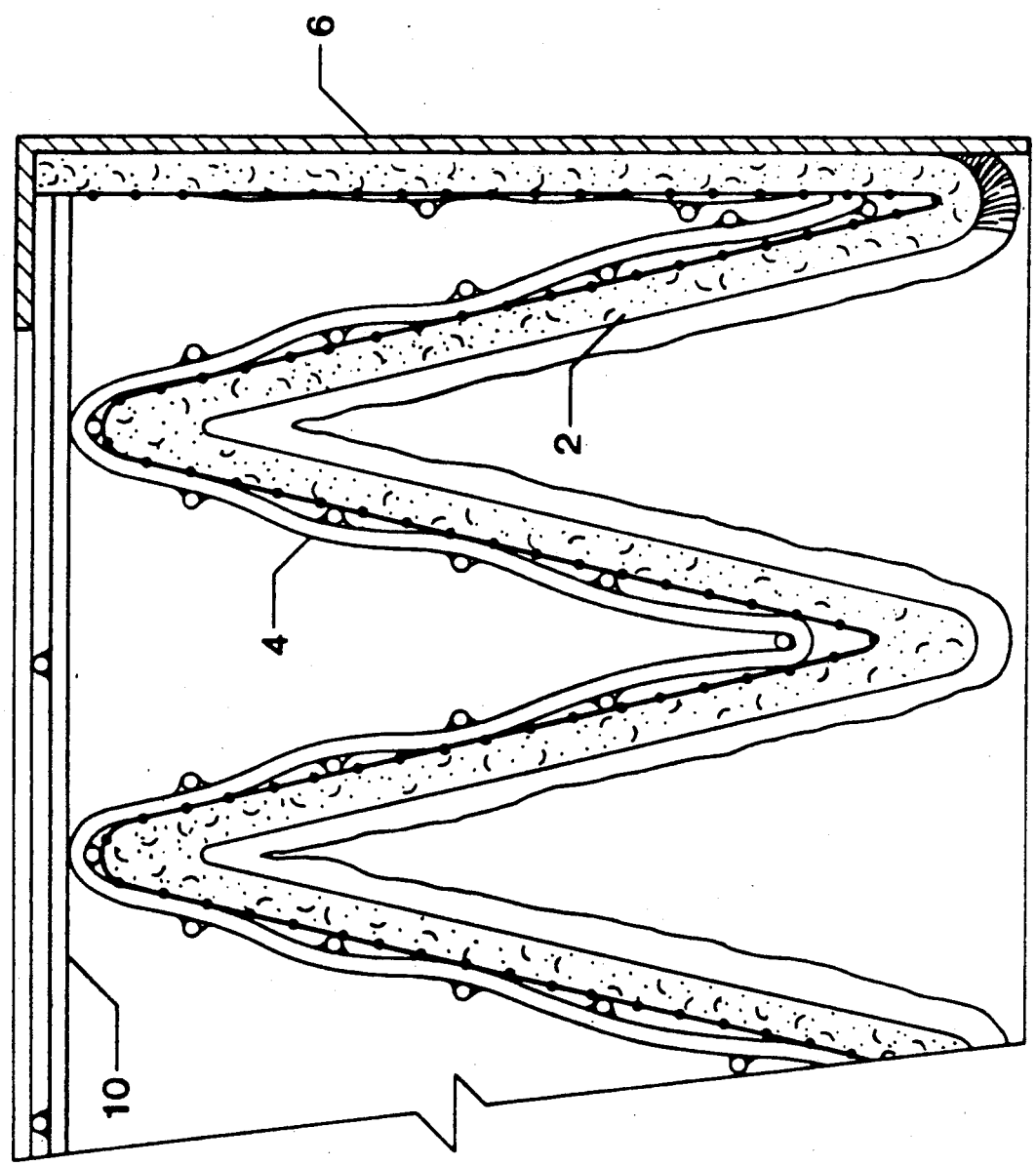
FIG. 3 is an enlarged sectional view taken essentially along line 'A' of FIG. 1 so as to reveal a cross section of the filter.

The backing material 4 is shaped so as to match the shape of the filter media 2 (FIG. 3). The backing material 4 is then placed on the side of the filter media which is downstream of a flow of gas through the filter media, so that the shaping of the filter media and backing respectively are congruent. The backing material will at all points contact the relevant congruent surface of the filter media.

The backing material may be any material which is relatively rigid and will allow air to pass through. That is, the backing material must be sufficiently rigid to hold its shape when force is applied to the backing material by the flow of gas through the filter media. The backing material is defined to be rigid for the purpose of this disclosure if it will accomplish such a requirement. It is not necessary that the backing material be totally rigid in all circumstances, in fact, a material such as wire mesh 4, which may be easily formed, is sufficiently rigid for most applications of this filter.

The backing material must also be sufficiently porous to allow the desired air flow volume through the filter media while providing adequate support for the filter media. It is desirable to construct the backing material from a material which will support the backing material, and which will allow air flow through the filter. A typical example of such a material is wire mesh 4, which has rectangular voids which are formed by intersecting wires, resulting in a material which is rigid as defined herein, while having a high percentage of air space relative to the overall surface area so as to allow air flow through the filter.

To further improve the blow-out resistance of the filter, the backing material may be folded around one or more edges of the filter media so as to cover a portion of the filter media on the upstream side. As shown in the preferred embodiment, the backing material is folded around two sides 8 of the filter media so as to cover a portion of the filter media which is near the edges around which the backing material is folded. As shown in FIG. 1, it is preferred that the backing material be folded around two sides 8 which are opposite each other, and in a manner which contacts as many pleats in the filter media as possible. The backing material which is folded around to the upstream side is shaped to match the filter media, and is congruent therewith.

The frame, if used, may be constructed of any suitable material, such as paper, plastic or sheet metal. The filter media and backing are attached to the frame. The frame may have a grid 10 or other similar structure to further retard the filter media from blowing out of the frame.

Figure 2:
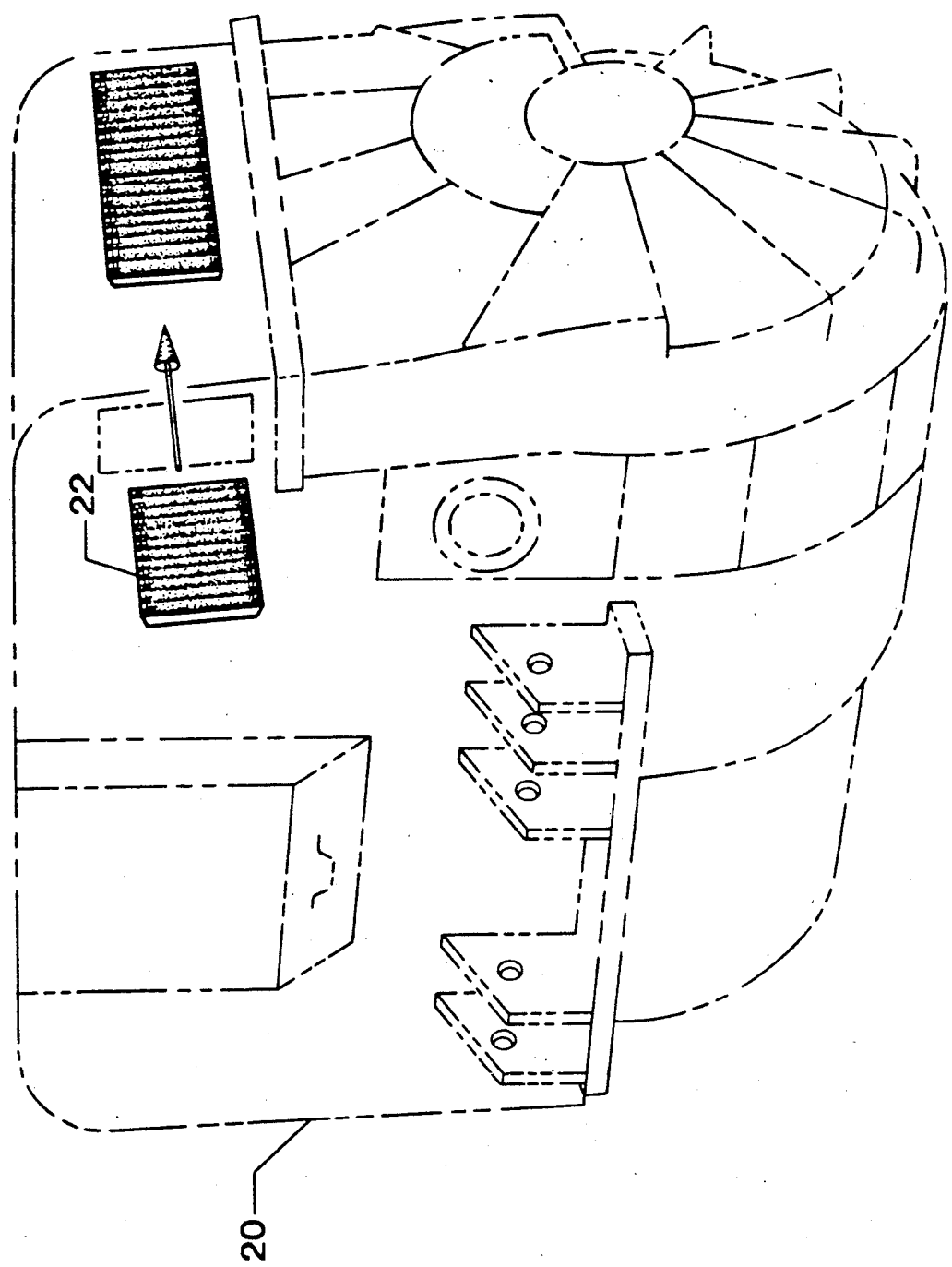
FIG. 2 shows three filters placed into an air handling unit, which is shown as a phantom, in perspective.

This filter may be used in numerous applications. One application is in an air handling unit 20. A filter may be used alone, or multiple filters 22 may be used by placing them adjacent to each other as shown in FIG. 2, although the filters could be placed in series, or in other configurations.

We claim:

1. A blow out resistant filter, comprising:
   a. a filter media which is pleated in shape; and
   b. a rigid, porous backing material which is pleated so as to be congruent to said filter media and which contacts said filter media on all surfaces of said filter media which are downstream of a flow of gas through said filter media, and wherein said backing material continues around two or more opposite edges of said filter media to cover a portion of an upstream side of said filter media to aid in holding and supporting said filter media, while leaving a majority of said upstream side of said filter media, uncovered.

2. A blow-out resistant filter as described in claim 1, wherein said backing material is wire mesh.

* * * * *